United States Patent [19]
Kester

[11] Patent Number: 6,129,803
[45] Date of Patent: Oct. 10, 2000

[54] METHOD FOR PRODUCING A THERMOPLASTIC CONTAINER

[75] Inventor: Dale C. Kester, Wichita, Kans.

[73] Assignee: Wescon Products, Inc., Wichita, Kans.

[21] Appl. No.: 08/922,053

[22] Filed: Sep. 2, 1997

[51] Int. Cl.[7] .................................................. B29C 49/06
[52] U.S. Cl. .................... 156/245; 156/308.6; 264/537; 425/525; 425/533
[58] Field of Search .................................. 264/523, 532, 264/537, 538; 215/40, 41, 398; 220/DIG. 5; 222/465.1, 475.1, 572; 156/196, 245, 308.6; 425/525, 533

[56] References Cited

U.S. PATENT DOCUMENTS

| | | | |
|---|---|---|---|
| 3,659,995 | 5/1972 | La Grutta | 425/533 |
| 3,694,124 | 9/1972 | Saumsiegle et al. | 425/533 |
| 4,363,415 | 12/1982 | Rainville | 215/396 |
| 4,703,871 | 11/1987 | Broker | 222/465.1 |
| 4,704,243 | 11/1987 | Nilsson et al. | 264/521 |
| 4,825,757 | 5/1989 | Stoner | 215/396 |
| 4,941,815 | 7/1990 | Julian | 264/537 |
| 4,989,757 | 2/1991 | Krall | 264/523 |
| 5,108,808 | 4/1992 | Johnson | 222/475.1 |
| 5,215,794 | 6/1993 | Johnson | 222/475.1 |

FOREIGN PATENT DOCUMENTS

| | | | |
|---|---|---|---|
| 62-95211 | 5/1987 | Japan . | |
| 62-196119 | 8/1987 | Japan | 264/523 |
| 64-72825 | 3/1989 | Japan | 264/523 |
| 2114502 | 8/1983 | United Kingdom | 264/523 |

Primary Examiner—Jan H. Silbaugh
Assistant Examiner—Suzanne E. McDowell
Attorney, Agent, or Firm—Edward L. Brown, Jr.

[57] ABSTRACT

A method of making an open mouth vessel with undercuts on the inside including the method steps of injection molding a cylindrical shape preform having a closed bottom and open mouth top with a lip therearound including a pouring spout in the lip; placing the preform in its molten state in a split blow mold, which mold supports and retains the bottom, lip and pouring spout in its original shape and pressurizing the preform to blow-form the cylindrical wall to the shape of the blow form mold.

10 Claims, 2 Drawing Sheets

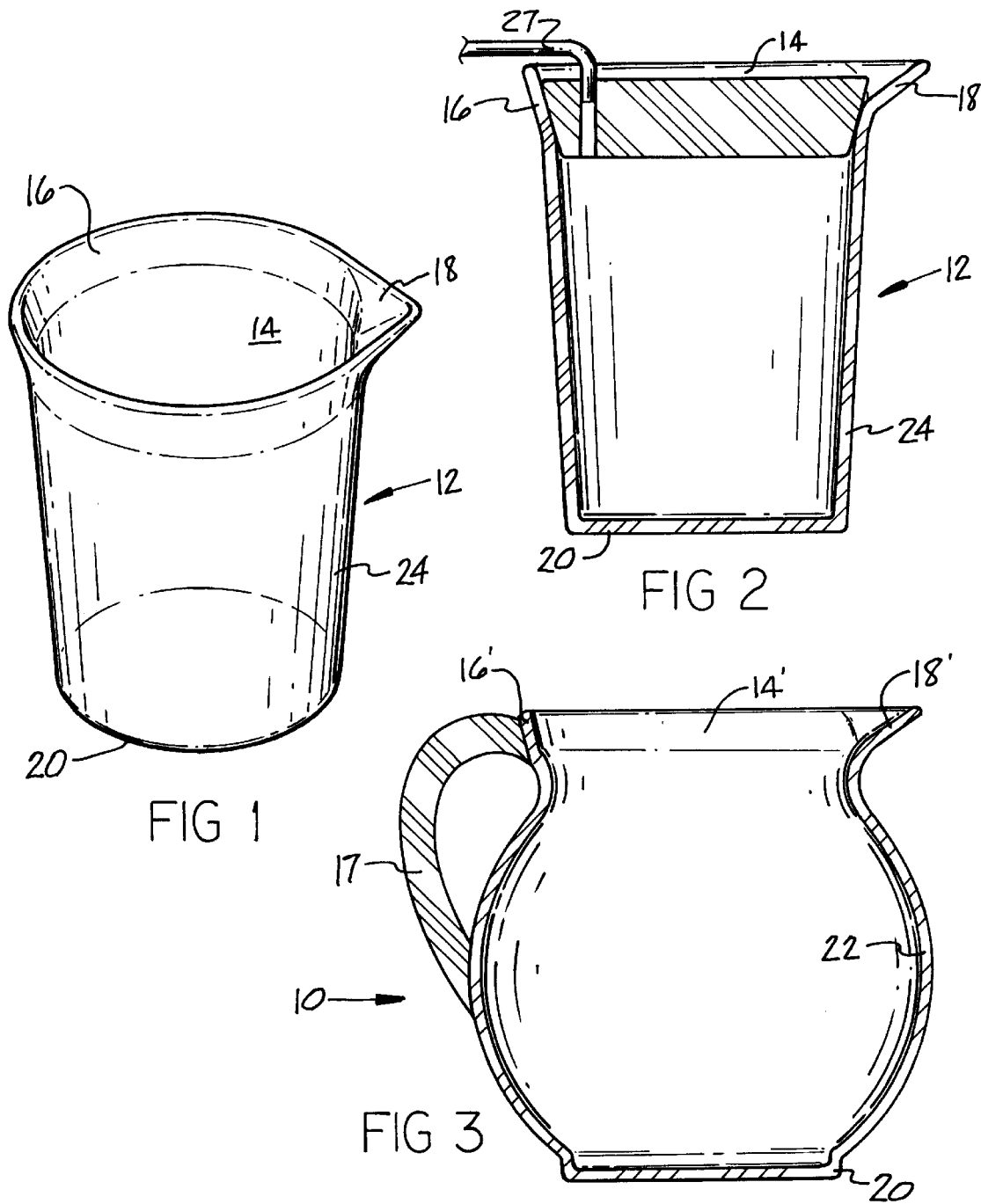

METHOD FOR PRODUCING A THERMOPLASTIC CONTAINER

BACKGROUND OF THE INVENTION

The present invention is a method of forming thermoplastic containers and specifically an ornamental household pitcher which utilizes the known molding techniques of injection molding and blow form molding of a preform in its semi-molten state.

The use of an injection molded preform which is then blow-formed has been done before as taught in U.S. Pat. No. 4,704,243 to Nilsson et al, which teaches a complex six stage molding process which takes an initial injection molded cylindrical-shaped blank having a closed bottom and forms it in five forming stages into a thin-walled vessel capable of light pressures as required in the soft drink industry. The opening of the vessel in the Nilsson patent is formed in one of the latter forming stages with a stretching mandrel while applicant's opening is formed in the initial injection molding step and is unaffected by the later blow-forming step which changes the basically cylindrical shape of the vessel to a spheroidal shape while retaining the flat bottom shape and the spout and lip of the top of the pitcher.

To injection mold a hollow part having an undercut is difficult and expensive by reason of the fact that the inner core of the mold must be collapsed about itself to remove the part from the mold creating a very complex and expensive core construction. Blow-forming of a shape having an undercut is relative simple to achieve however, it almost always requires some type of movable mandrel in the blow-forming step as illustrated in the above-mentioned patent to Nilsson et al.

The general concept of utilizing an injection molded cylindrical vessel in a blow-forming mold for final shape is generally taught in the Japanese Patent No. 62-95211. In this patent the open end of the cylindrical blank, also referred to as a "preform" is necked down to form a smaller diameter opening and in the third blow-forming stage a split mold is utilized to form a ring-shaped projection at the mouth of the bottle for its final shape.

The present invention is distinguishable over both of the above-mentioned patents in that the flared lip and pouring spout at the mouth of the vessel along with the bottom are formed initially in the injection molding step or stage without any alteration in the blow-forming step. The preform shaped in the injection molding stage is a cylindrical vessel and an opened top with the lip therearound including a pouring spout. While still the thermoplastic temperature range, the preform is placed into a split blow mold fixture with the previously formed lip and pouring spout held in position by the surfaces of the mold and an elastic plug inserted in the opened end of the vessel. Whereupon an air line passing through the plug applies pressure to the interior of the preform thus causing the cylindrical wall of the vessel to flow outward to the shape of the blow mold. This flow of the cylinder wall takes place without altering the shape of the lip, spout and the bottom of the vessel. The particular blow-formed shape as illustrated in the drawing is substantially spherical with a concave, annular ring just below the lip of the vessel.

After removal from the blow-forming mold and cooled, a handle formed of a similar plastic is attached to the vessel through a solvent weld thus forming the ornamental pitcher of the present invention.

The principal object of the present invention is to provide a method of forming a thermoplastic housewares pitcher with a minimum of forming steps and mold cost.

Another object of the present invention is to provide a method of forming an undercut opened top vessel with a simplified two-stage process.

Another object of the present invention is to provide a molding method whereby an initial preform is blow molded to its final shape while retaining the top and bottom areas of the preform in their initial shape.

BRIEF DESCRIPTION OF THE DRAWINGS

FIG. 1 is a perspective view of the preform after it is removed from the injection molding stage;

FIG. 2 is a vertical sectional view of the preform as shown in FIG. 1 with a plug placed in the mouth of the preform;

FIG. 3 is a vertical sectional view of the final shape of the vessel and attached handle;

DETAILED DESCRIPTION OF THE PREFERRED EMBODIMENTS

Figure 6:
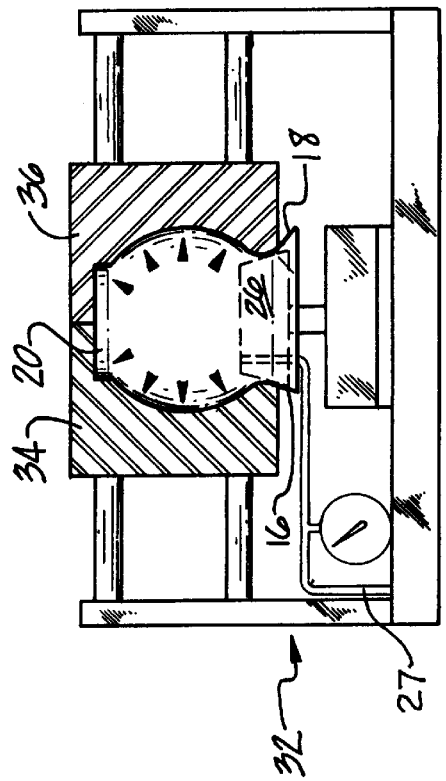
FIG. 6 is a view of the closed blow mold fixture with the vessel blow formed to its final shape.

Depicted in FIG. 1 is a cylindrical-shaped vessel 12 having an opened mouth 14 and a closed bottom 20. The cylindrical wall 24 of the vessel at its upper edge is shaped with an outwardly extending lip 16 surrounding the mouth which is integrally formed with a pouring spout 18.

In FIG. 2 the cylindrical-shaped vessel 12, also referred to as a preform includes an elastic plug 22 placed in the mouth 14 of the vessel in a pressure sealing relation. Passing through plug 22 is a conduit 27 which connects to an air pressure source, not shown in the drawing, which provides the necessary pressure for the blow-forming step of the method.

FIG. 3 illustrates the vessel in its final shape after the blow-forming step has shaped the wall 22 of the vessel into a spheroidal shape while retaining the bottom 20', lip 16' and pouring spout 18' in their originally molded shapes as best seen in FIG. 2.

Figure 4:
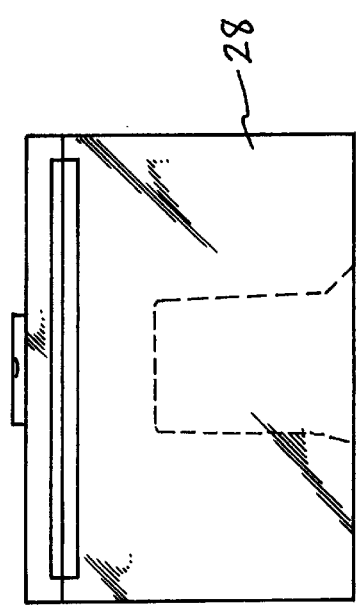
FIG. 4 is a symbolic view of an opened injection molding fixture with the preform removed.

In the initial stage of the molding process, as seen in FIG. 4, the injection molding fixture, including a conventional mold 28 and a core 30, are shown in an opened position with the preform 12 removed from the core.

Figure 5:
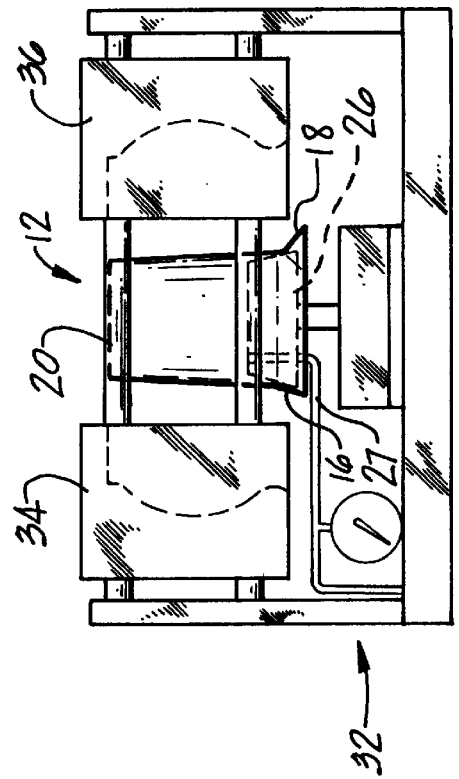
FIG. 5 is a symbolic view of an opened split mold, molding fixture with the preform placed therein.

In the second molding stage, as shown in FIG. 5, the preform 12 is positioned in the blow-molding fixture 32 between the split molds 34 and 36. Positioned in the mouth of the preform 12 is an elastic plug 26 which is supported by the mold fixture 32 in alignment between split molds 34 and 36. The split molds are then moved together to their positions shown in FIG. 6, surrounding and engaging the preform about its bottom 20 and its lip and spout 16 and 18. Passing through plug 26 is a conduit 27 which in turn is connected to a pressure source, not shown in the drawing. With the preform in a semimolten state, the interior of the preform 12 is pressurized to approximately 15 PSI through line 27 thus causing the cylindrical walls of the vessel to flow into the spherical shape of the split molds 34 and 36 as seen in FIG. 6. After the blow-forming stage is completed and cooled, the cavity is opened and the blown vessel 22 is removed from the fixture 32. A handle 17 is attached to the pitcher 10 by solvent welding or any other type of thermal or adhesive bonding to provide a finished product. The particular blow form shape as shown in the drawings is basically spherical, however various other shapes could be formed from the cylindrical side wall 24 such as an oblong shape in lateral cross section or planar wall panels in a variety of combined shapes. Basically, the walls of the pitcher 10 can be blow-formed into almost any shape larger than the cylindrical wall 24 of the preform. The pitcher 10 can be molded from polystyrene, polyethylene, polypropylene, polyethylene terephthalate (PET), as well as numerous other thermoplastics.

The description and the figures have described the preform as having a cylindrical wall shape, however other shapes are also suitable. As for example, the opened mouth of the pitcher could be square rather than circular and the wall portion could be planar.

What is claimed is:

1. A method of making an open mouth vessel with undercuts on the inside thereof, comprising the steps of:

injection molding a cylindrical-shaped preform having a closed bottom and an open mouth top with a lip therearound including a pouring spout in the lip;

withdrawing the preform from the injection mold while in a semimolten state;

placing the semi-molten preform in a split blow mold fixture which supports and retains the bottom, lip and pouring spout in the preform's original shape;

plugging the open mouth top and pressurizing the preform to blow form the cylindrical wall to the shape of the blow mold thereby forming said open mouth vessel having undercuts therein wherein the bottom, lip and pouring spout of the vessel have the same shape as the preform.

2. A method as defined in claim 1 wherein a molded handle is attached to the exterior of the vessel by means of a solvent weld.

3. A method as defined in claim 1 wherein the blow mold shape is spheroidal.

4. A method as defined in claim 1 wherein the blow mold fixture includes two halves split along a plane passing through the axis of rotation of the cylindrical shaped vessel.

5. A method as defined in claim 1 wherein the split blow mold is water cooled.

6. A method of making an open mouth vessel with undercuts on the inside thereof, comprising the steps of:

injection molding a cylindrical-shaped preform having a closed bottom and an open mouth top with a lip therearound;

withdrawing the preform from the injection mold while in a semimolten state;

placing the semi-molten preform in a split blow mold fixture which supports and retains the bottom and lip of the preform in the mold in its original shape;

plugging the open mouth top and pressurizing the preform to blow form the cylindrical wall to the shape of the blow mold thereby forming said open mouth vessel having undercuts therein wherein the bottom and lip of the vessel have the same shape as the preform.

7. A method as defined in claim 6 wherein a molded handle is attached to the exterior of the vessel by means of a solvent weld.

8. A method as defined in claim 6 wherein the blow mold shape is spheroidal.

9. A method as defined in claim 6 wherein the blow mold fixture includes two halves split along a plane passing through the axis of rotation of the cylindrical shaped vessel.

10. A method as defined in claim 6 wherein the split blow mold is water cooled.

* * * * *